Oct. 9, 1934.  W. VEIT  1,975,883
METHOD OF MANUFACTURING LINOLEUM
Filed Sept. 21, 1932   2 Sheets-Sheet 1

INVENTOR
WALTER VEIT
BY Gordon C. Willard
ATTORNEY

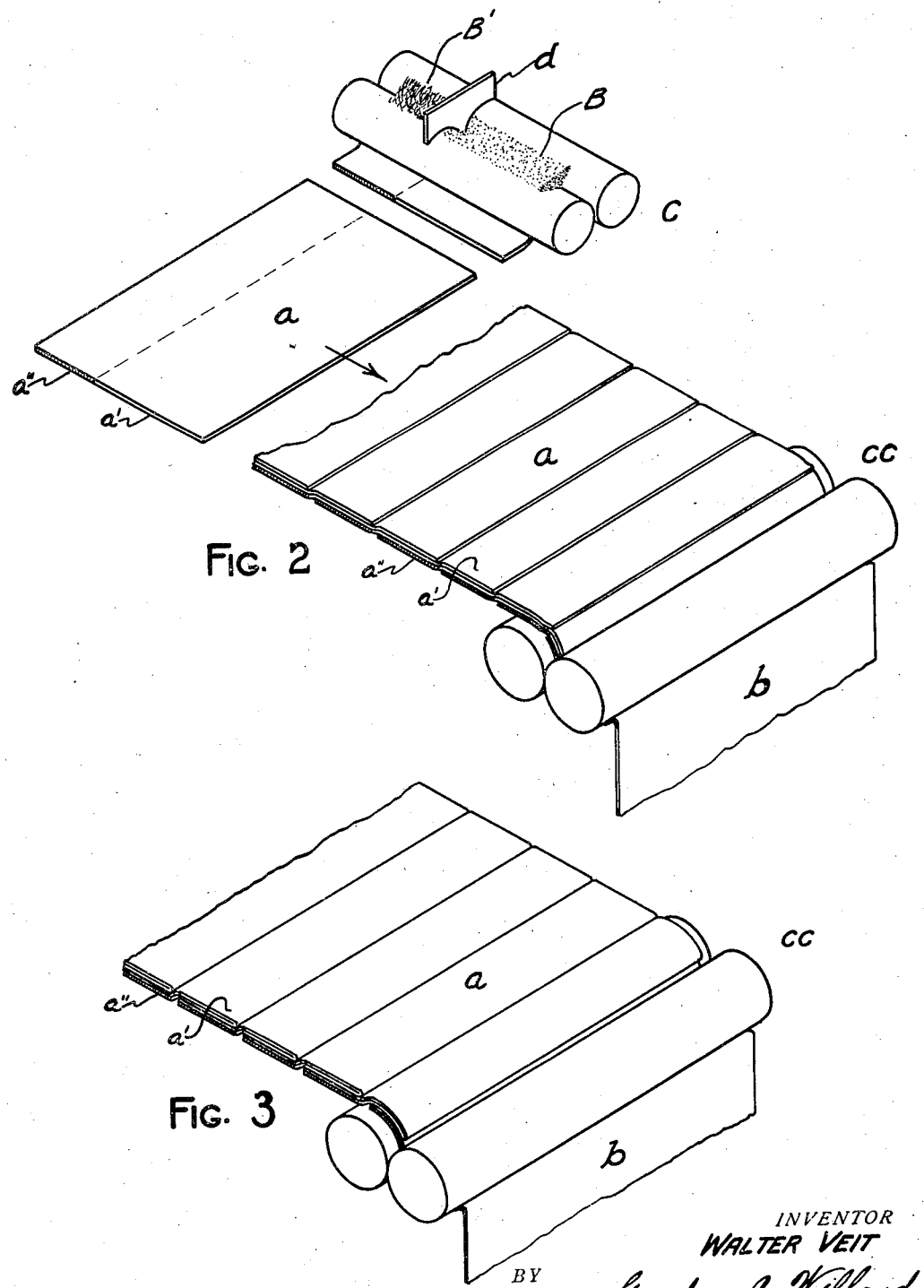

Patented Oct. 9, 1934

1,975,883

UNITED STATES PATENT OFFICE 1,975,883

METHOD OF MANUFACTURING LINOLEUM

Walter Veit, East Orange, N. J., assignor to Congoleum-Nairn, Inc., a corporation of New York Application September 21, 1932, Serial No. 634,088

5 Claims. (Cl. 154—25)

The present invention relates to the manufacture of inlaid linoleum or the like and more particularly to the method of manufacturing inlaid linoleum by means of automatic inlaying machinery in which linoleum composition of different colors, in the form of sheets, is taken from continuously rotating calender rolls to continuously operating cutting cylinders, where it is cut into tesseræ of the required shape and size, these tesseræ being continuously assembled on a suitable backing and thereafter consolidated by pressure and heat into a homogeneous surface covering.

In such continuous operation only one finished covering is produced whatever be the number of colored sheets from which it is assembled, and it is necessary to reject a quantity of material from these sheets equal in volume to one sheet less than the total number of sheets being used to produce the required pattern. The sheet material so rejected from one cutting cylinder, when of a single color, is returned to the mixing system where it is incorporated with fresh or virgin color composition, reformed into a sheet, and again fed to the same cutting cylinder. This method of operation, while satisfactory when each sheet is mono-colored, cannot readily be practiced in the production of patterns consisting of pattern elements having a variagated decoration within the content of the same element, because the grained or marble appearance of the sheet as originally produced from fresh color, cannot be reproduced when the variegated reject material therefrom is returned and incorporated with fresh composition and again sheeted.

The principal object of this invention is to provide an improved method whereby patterns having a marble or other variegated type of decoration may be produced continuously and whereby the variegated reject composition from the cutting cylinders may be employed directly and continuously in the same pattern without limiting or modifying the desired type of decoration. More particularly, this invention contemplates certain improvements in the method described and claimed in my prior Letters Patent No. 1,741,488, issued December 31, 1929, such improvements providing a simplified method, more practical in operation.

The improved method of my present invention comprises as the first step forming two separate and distinct blends of variously colored linoleum compositions, one blend consisting of a substantial proportion, usually a major proportion, of homogenized reject composition and a limited proportion of differently colored fresh or virgin compositions, and the other blend consisting of a relatively greater proportion of differently colored fresh or virgin compositions. The two blends thus prepared are then, according to the preferred embodiment of my invention, formed into series of primary sheets, one section of each sheet being composed of one blend, and another section of each sheet being composed of the other blend. These multi-section primary sheets are next positioned in over-lapping, cross-rolling relation whereby corresponding sections of successive primary sheets form one face of the over-lapping series, and are combined and consolidated into a single continuous variegated sheet. The continuous sheet thus produced is cut into tesseræ, certain tesseræ being utilized, and certain other tesseræ being rejected, according to the pattern, and the rejected tesseræ are homogenized and re-used in a direct continuous cycle in the formation of additional primary sheets.

In the accompanying drawings:

Figures 2 and 3 are perspective views showing various methods of manipulating and combining the primary sheets into a single continuous unitary sheet;

Linoleum or other plastic composition may be formed in numerous ways well known in the art into sheets having a variegated decoration. For the purpose of illustrating this invention, however, particular reference will be made to the method of manufacturing continuous variegated sheets of linoleum composition according to the method described in claim of U. S. Letters Patent No. 1,763,314, issued June 10, 1930, to M. S. McConoughey, although it is to be understood that the invention is not thus limited. According to the method referred to, a series of individual primary sheets are formed from lumps or particles of differently colored linoleum composition. In the process of rolling the lump composition into sheets, the several colors are elongated giving the primary sheet a striated appearance. These primary sheets are then positioned in overlapping, cross-rolling relation and consolidated by rolling to modify the striations and to form a continuous sheet having a non-directional variegated effect simulating marble. Thus, in producing variegated inlaid linoleum in accordance with my present invention, a series of variously colored fresh or virgin linoleum compositions in lump form is first prepared. Each color will be compounded separately by admixing, in the usual way, the conventional raw materials, wood flour, mineral fillers and pigments, etc., and the composition finally reduced to the form of lumps of pea size or larger, by a conventional apparatus commonly known as a "german", or by an equivalent device. Simultaneously the variegated rejects, as discarded at the cutting cylinder from the corresponding previously formed variegated sheet, are returned to another "german" of the conventional type where the several colors of the reject composition are homogenized and the composition is also reduced to the form of lumps or particles.

Figure 1:
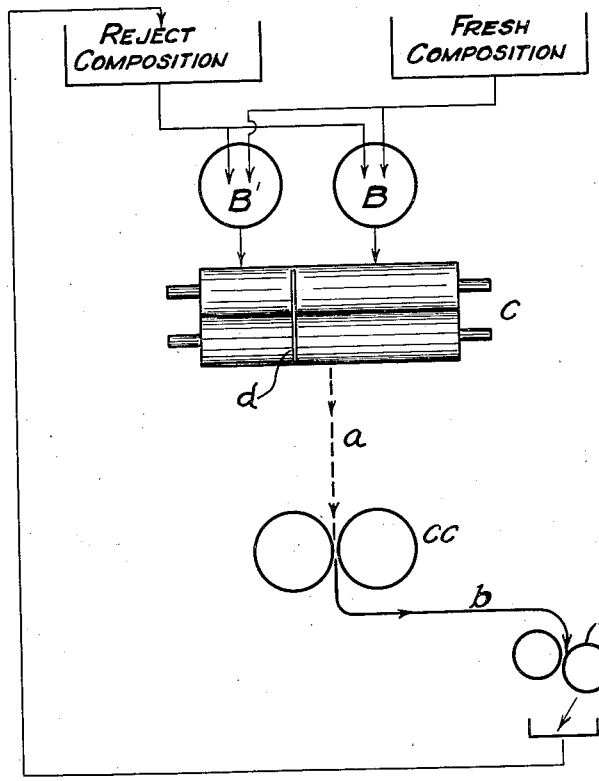
Figure 1 is a diagrammatic representation of the flow of materials according to the present invention.

From these variously colored virgin linoleum compositions, and from the mono-colored homogenized reject composition thus preformed, I prepare two color blends B and B', see Figure 1. These color blends are made up according to the decoration desired, by admixing and tumbling together in definite proportions the lump compositions of the selected colors. In each blend the colors of fresh composition are employed in relatively the same proportions. The color blend B, however, which will be used in forming the decorative and wear surface of the ultimate sheet is made up according to a predetermined formula and comprises a substantially greater proportion of the fresh or virgin compositions than color blend B'. Correspondingly, color blend B' comprises a relatively greater proportion of homogenized reject or re-used composition. It is to be observed, however, that the homogenized reject composition, being formed directly from the variegated rejects, consists of the same colors in relatively the same proportion as exists in the mixtures of fresh composition, although such colors are homogenized and blended.

The two blends B and B' prepared in the manner described, are conveyed to a primary sheeting calender C. This calender comprises a pair of rolls with a conventional hopper (not shown) above them and is provided with a partition $d$ at right angles to the axes of the rolls and spaced slightly therefrom, dividing the hopper into two separate compartments. Blend B is delivered into one compartment, blend B' into the other, and the two are consolidated to form a single continuous and integral primary sheet $a$ comprising a section $a'$ composed of blend B and a section $a''$ composed of blend B'. In practice it is preferable to restrict the area of the section $a''$ to about one-third of the total area of the primary sheet $a$. Hence, the partition $a$ will be located accordingly and the blends B and B' will be prepared in corresponding relative amounts.

The continuous primary sheet $a$ thus produced is next cut into units of a length slightly greater than the width of the final sheet to be produced. Successive units are positioned in overlapping, cross-rolling relation, as shown in Figures 2 and 3. The preferred method of positioning the primary sheets $a$ involves first folding each sheet about an axis parallel with the striations and presenting the folded edge toward the bite of the calender roll, as shown in Figure 3. Satisfactory results may be obtained, however, by following the procedure shown in Figure 2 of simply overlapping the primary sheets. Whether the primary sheets are folded or not folded, corresponding portions of each sheet will be positioned in corresponding relation, i. e., so that the one face of the overlapped series of sheets is composed of sections $a'$ whereas the opposite or underneath face of the overlapped sheets will be composed of the sections $a''$. The continuous series of overlapped sheets $a$ are then conveyed to a secondary calender CC comprising a pair of rolls where the individual sheets are consolidated into a single continuous variegated sheet $b$.

It should be noted that the manipulation of the primary sheets $a$, as described above in connection with Figures 2 and 3, results in the formation of a final continuous variegated sheet $b$ having one face, which will constitute the wearing or decorative surface, composed of sections $a'$ of the primary sheets which sections in turn are composed of blend B, and having the opposite face or base of the sheet composed of sections $a''$ of the primary sheets which sections in turn are composed of blend B'. By localizing a relatively greater proportion of the homogenized reject composition in sections $a''$, and by forming the sections $a'$ from a blend comprising a relatively greater proportion of fresh or virgin composition, it becomes possible to control and maintain the variegated decoration of the wearing face of the sheet $b$ within the normal limits and at the same time to completely utilize the reject composition. Furthermore, as the actual color composition of blends B and B' are similar, a cross section of the sheet $b$ exhibits no laminated appearance.

The continuous unitary sheet $b$ formed by the consolidating and combining operation, may be used directly in the automatic inlaying machines of the Walton type or other types requiring a continuous sheet. When so used it is cut into blocks or tesseræ by means of a cutting cylinder E, certain tesseræ being rejected and certain other tesseræ being utilized. The tesseræ which are utilized are positioned on a suitable backing carried by the inlaying drum F together with blocks or tesseræ from similar sheets, and a complete color pattern is thus formed. The rejects from the sheet $b$ are returned directly to a "german", as above described, where the several colors are homogenized, the composition reduced to lump form, and the successive steps of the method are repeated in a continuous cycle.

As a typical example illustrating the application of my invention, let it be assumed that the desired variegated decoration of the wearing surface of the ultimate sheet $b$, is to comprise four differently colored fresh or virgin linoleum compositions, L, M, N, and O, to the extent of 60%, and also as a fifth color, R, the homogenized reject composition to the extent of 40%. Further, let it be assumed that only 50% of the final sheet is utilized, thus necessitating the re-use of 50% rejects in succeeding portions of the same sheet if accumulation of rejects is to be avoided and the system is to be in balance. Following the teachings of my invention, the two color blends are made up as follows:—

| Composition | Blend B | Blend B' | Total |
|---|---|---|---|
| | Parts | Parts | Parts |
| L | 4 | 1 | 5 |
| M | 8 | 2 | 10 |
| N | 12 | 3 | 15 |
| O | 16 | 4 | 20 |
| R | 27 | 23 | 50 |
| | 67 | 33 | 100 |

The percent of reject composition in blend B is noted to be 40%, or within the limit specified, while that in blend B' is approximately 70%. The total percentage of reject composition in both blends, however, is 50% or the amount required to be re-used. Thus, the desired decoration is obtained and the accumulation of reject composition, which would otherwise be very substantial (10% of the continuous sheet b) is prevented. With increased amounts of reject composition to be re-used, substantially more may be utilized by increasing the percentage of composition R in the blend B', or by increasing the relative proportion of blend B' to blend B as hereinafter described, or both.

Figure 4:
Figures 4 and 5 illustrate modified constructions of the primary calender rolls hereinafter described.
Figure 5:

In Figures 4 and 5 are illustrated modified constructions of the primary calender which may be employed in order to utilize a larger proportion of blend B'. While it is preferable to restrict the area of section a" of the primary sheet a to approximately one-third of the total area, it is possible to considerably increase the amount of the composition used by increasing the thickness of section a". Such increased thickness may be secured by employing either tapered calender rolls C' as shown in Figure 4 or a pair of rolls C", one of which is of multiple diameter as shown in Figure 5.

Among the advantages which the present invention affords may be mentioned: (1) eliminating the accumulation of scrap composition from rejects; (2) making production independent of the necessity of finding use for scrap material in mono-colored compositions; (3) saving expensive pigments otherwise required to convert rejects into mono-colored composition; (4) preventing the aging of scrap composition caused by the necessity of storing the same; (5) using chiefly fresh composition for the formation of the decorative and wearing portions of the covering manufactured; and (6) reducing handling costs by re-using the reject composition in a direct continuous cycle.

Furthermore, the above described preferred embodiment of my invention is distinguished from and offers a very important advantage over the method described in my prior patent, namely, that the production of all of the primary sheets utilized in forming any sheet b may be accomplished with a single primary calender. It is to be understood, however, that the essential teachings of this invention, so far as it concerns the use of two distinct blends of composition of the character above described, may also be carried out if desired, by using two sets of primary calender rolls. In such a case, two distinct series of primary sheets will be formed, one series composed of blend B, and the other series of blend B', the two series of primary sheets being subsequently combined, according to the teachings of my prior patent, to produce a single continuous variegated sheet b. Such practice retains the advantages of permitting ready control of the variegated decoration and providing for complete utilization of the reject composition, although it entails the disadvantage of requiring additional equipment.

I claim

1. The method of manufacturing variegated linoleum which comprises forming two blends of variously colored linoleum compositions, one blend comprising a substantial proportion of homogenized reject composition and a limited proportion of fresh or virgin compositions, the other blend comprising a relatively greater proportion of fresh or virgin compositions, and both blends comprising the several variously colored fresh or virgin compositions in substantially the same relative proportions; consolidating the respective blends into primary sheets; positioning said primary sheets in overlapping, cross-rolling relation whereby the consolidated blend comprising the relatively greater proportion of fresh or virgin compositions forms one face of the overlapped series; and cross-rolling and consolidating the succession of overlapped sheets to form a continuous variegated sheet.

2. The method of manufacturing variegated inlaid linoleum which comprises forming two blends of variously colored linoleum compositions, one blend comprising a substantial proportion of homogenized reject composition and a limited proportion of fresh or virgin compositions, the other blend comprising a relatively greater proportion of fresh or virgin compositions, and both blends comprising the several variously colored fresh or virgin compositions in substantially the same relative proportions; consolidating the respective blends into a single series of primary sheets, one section of each sheet being composed of one blend and another section of each sheet being composed of the other blend; positioning said primary sheets in overlapping, cross-rolling relation whereby those sections comprising the relatively greater proportion of fresh or virgin compositions form one face of the overlapped series; cross-rolling and consolidating the succession of over-lapped sheets to form a continuous variegated sheet; cutting tesseræ from said continuous sheet; utilizing certain of said tesseræ; rejecting certain other of said tesseræ; homogenizing the rejected tesseræ; and employing the homogenized rejects in a continuous direct cycle in the formation of additional primary sheets.

3. The method of manufacturing variegated linoleum which comprises forming a series of variegated primary sheets of variously colored linoleum compositions, one section of each sheet comprising a substantial proportion of reject composition and a limited proportion of fresh or virgin compositions, and another section of each sheet comprising a relatively greater proportion of fresh or virgin compositions; positioning the sheets of such series in overlapping, cross-rolling relation whereby those sections composed of the relatively greater proportion of fresh compositions form one face of the overlapped series, and cross-rolling and consolidating the succession of overlapped sheets to form a continuous variegated sheet.

4. The method of manufacturing variegated inlaid linoleum which comprises forming a series of variegated primary sheets of variously colored linoleum compositions, one section of each sheet comprising a substantial proportion of homogenized reject composition and a limited proportion of fresh or virgin compositions, and another section of each sheet comprising a relatively greater proportion of fresh or virgin compositions; positioning the sheets of such series in overlapping, cross-rolling relation whereby those sections composed of the relatively greater proportion of fresh compositions form one face of the overlapped series; cross-rolling and consolidating the succession of overlapped sheets to form a continuous variegated sheet; cutting tesseræ from said continuous sheet; utilizing certain of said tesseræ; rejecting certain other of said tesseræ; homogenizing the rejected tesseræ; and employing the homogenized rejects in a continuous direct cycle in the formation of additional primary sheets.

5. The method of manufacturing variegated inlaid linoleum which comprises forming a series of variegated primary sheets of variously colored linoleum compositions, one section of each sheet comprising a substantial proportion of homogenized reject composition and a limited proportion of fresh or virgin compositions, and another section of each sheet comprising a relatively greater proportion of fresh or virgin compositions; folding each sheet; positioning the folded sheets in overlapping, cross-rolling relation whereby those sections composed of the relatively greater proportion of fresh compositions form one face of the overlapped series; cross-rolling and consolidating the succession of overlapped sheets to form a continuous variegated sheet; cutting tesseræ from said continuous sheet; utilizing certain of said tesseræ; rejecting certain other of said tesseræ; homogenizing the rejected tesseræ; and employing the homogenized rejects in a continuous direct cycle in the formation of additional primary sheets.

WALTER VEIT.